US010397094B2

(12) United States Patent
Karthikeyan et al.

(10) Patent No.: US 10,397,094 B2
(45) Date of Patent: Aug. 27, 2019

(54) MULTICAST ROUTING SYSTEM AND METHOD

(71) Applicant: BRITISH TELECOMMUNICATIONS PUBLIC LIMITED COMPANY, London (GB)

(72) Inventors: Vidhyalakshmi Karthikeyan, London (GB); Detlef Nauck, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 158 days.

(21) Appl. No.: 14/780,699

(22) PCT Filed: Mar. 27, 2014

(86) PCT No.: PCT/GB2014/000118
§ 371 (c)(1),
(2) Date: Sep. 28, 2015

(87) PCT Pub. No.: WO2014/155040
PCT Pub. Date: Oct. 2, 2014

(65) Prior Publication Data

US 2016/0043932 A1 Feb. 11, 2016

(30) Foreign Application Priority Data

Mar. 28, 2013 (EP) .................................... 13250050

(51) Int. Cl.
*H04L 12/721* (2013.01)
*H04L 12/761* (2013.01)
(Continued)

(52) U.S. Cl.
CPC ............ *H04L 45/123* (2013.01); *H04L 12/18* (2013.01); *H04L 45/16* (2013.01); *H04L 45/125* (2013.01)

(58) Field of Classification Search
CPC ....... H04L 45/00; H04L 12/18; H04L 45/123; H04L 45/125; H04L 45/16; H04L 45/12
See application file for complete search history.

(56) References Cited

U.S. PATENT DOCUMENTS 8,700,801 B2 * 4/2014 Medved ................. H04L 45/02 709/242
8,838,724 B2 * 9/2014 Xie ..................... H04L 67/2852 709/213
(Continued)

OTHER PUBLICATIONS

International Search Report for PCT/GB2014/000118 dated Jul. 2, 2014, three pages.

*Primary Examiner* — Ayaz R Sheikh
*Assistant Examiner* — Debebe A Asefa
(74) *Attorney, Agent, or Firm* — Nixon & Vanderhye P.C.

(57) ABSTRACT

There is described a method of managing routing paths, in particular multicast routing paths, in a content delivery network. The method includes determining, according to a unicast routing protocol, a first link cost for a first routing path and determining a second link cost for a second routing path, the second routing path comprising a first component comprising a link cost to a router that is part of a multicast group and a second component comprising a link cost for the multicast tree from the router. An adjustment factor is then determined based on information received from the content delivery network. The adjustment factor is applied to the second link cost. The adjusted second link cost and the first link cost are analyzed to determine an adjusted least cost path in the content delivery network and the adjusted second link cost is selectively output to a routing database to influence routing in the content delivery network.

17 Claims, 3 Drawing Sheets

(51) Int. Cl.
*H04L 12/18* (2006.01)
*H04L 12/729* (2013.01)

(56) References Cited

U.S. PATENT DOCUMENTS

| | | | | |
|---|---|---|---|---|
| 9,893,951 | B1 * | 2/2018 | Medved | H04L 41/12 |
| 2007/0133530 | A1 * | 6/2007 | Previdi | H04L 12/185 370/390 |
| 2010/0085916 | A1 * | 4/2010 | Yu | H04L 45/00 370/328 |

* cited by examiner

MULTICAST ROUTING SYSTEM AND METHOD

BACKGROUND AND SUMMARY

This application is the U.S. national phase of International Application No. PCT/GB2014/000118 filed 27 Mar. 2014 which designated the U.S. and claims priority to EP Patent Application No. 13250050.5 filed 28 Mar. 2013, the entire contents of each of which are hereby incorporated by reference.

The present invention relates to the field of multicast routing and, in particular embodiments, to systems and method for growing a multicast tree.

In many networks, several end user terminals, or hosts, wish to receive the same data at the same time. This data can include anything from video or audio content to software updates to information about the network itself. While it would be possible to send this information simultaneously and individually to each host in the network, this would involve the transmission of large amounts of replicated data throughout the network. An alternative approach would be to broadcast the data by flooding the whole network with the data and enabling any host that was interesting in receiving the data to do so, while other hosts simply ignore the irrelevant packets. However, there may be significant branches of the network that do not include any hosts that are interested in receiving the data. Therefore, broadcasting methods also risk generating significant amounts of unwanted data in the network.

Methods of multicasting data have therefore been developed in which data is transmitted through the network only to those destinations or hosts that have indicated a desire to receive the data, by joining the multicast group for that data. However, multicast data is replicated in the network only where the route to two destination hosts splits. Therefore, only one copy of the data is sent through the network until routes to the destination hosts diverge. Data is therefore sent out through the network in a multicast tree, from which branches are formed as routes to various destinations diverge.

Multicast routing protocols govern how such multicast trees are formed, as described in more detail below, but usually a request is sent upstream from the host towards the multicast source and the host forms a new branch from the tree at the first upstream router it finds that is already part of the multicast tree.

Khuller et al, "*Balancing Minimum Spanning and shortest path trees*", XP055078016 is a theoretical paper that shows that for each graph, (or network) with weighted edges (link costs) a tree exists that connects a number of leaf nodes to a root node and that balances between a minimum spanning tree (i.e. the sum of link costs) and a shortest path tree (where each path from the root to a leaf is the shortest possible path). The paper presents an algorithm to find such a tree and shows that it is optimal. The algorithm finds one tree and that tree does not change or evolve over time.

Ben-Shimol et al, "*SPLAST: a novel approach for multicasting in mobile wireless ad hoc networks*", PIMRC 2004, 15th IEEE International Symposium, Barcelona, vol. 2, September 2004, pp 1011-1015, provides an algorithm to build a multicast tree in mobile ad hoc networks. The tree minimises the sum of link costs and the length of the paths from the root. The algorithm also shows how to recover from failing links, change in link cost, and the disappearance and reappearance of edge nodes. The cost of a link between two nodes is defined as a function of the power transmission level that is required to establish a connection between the two nodes. The tree only change if links or nodes change, but it does not evolve with usage for multicasting.

According to one aspect, there is provided a method of managing routing paths in a content delivery network, the method comprising:

- determining, according to a unicast routing protocol, a first link cost for a first routing path;
- determining a second link cost for a second routing path, the second routing path comprising a first component comprising a link cost to a router that is part of a multicast group and a second component comprising a link cost for the multicast tree from the router;
- determining an adjustment factor based on information received from the content delivery network;
- applying the adjustment factor to the second link cost;
- analysing the adjusted second link cost and the first link cost to determine an adjusted least cost path in the content delivery network; and
- selectively outputting the adjusted second link cost to a routing database to influence routing in the content delivery network.

The method may enable the system to select a routing path that is different from the multicast routing path that would be built using standard unicast routing protocols. The decision to use the alternative routing path can be based on information obtained from the network, as described in more detail below. The second routing path includes a first section that connects the requesting destination to a router that is already part of the multicast group, but that is not part of the standard unicast-created path back towards the source. The second routing path also includes a second section that comprises an existing multicast routing path from the router back to the source, Rendezvous Point (RP) or Source Designated Router (S-DR) for the multicast stream.

The first and/or second routing paths may be multicast routing paths.

In some embodiments, adjustment factors are applied on a per-link basis and the adjusted link cost for the whole route is determined by combining the adjusted per-link values. In other embodiments, the link cost for the route as a whole is determined and an adjustment factor is determined and applied to the link cost for the whole route.

In a particular embodiment, the adjustment factor is calculated based on a predictive model.

The analysing step can determine whether the first or second multicast routing path provides the preferred path along which the stream can be delivered based on the adjusted link cost values. Optionally the path with the lower associated link cost value is the preferred path. If the first path is determined to be the preferred path, then the network is permitted to set up the multicast tree according to the shorted path back to the source. If the second path is determined to be the preferred path, then the adjusted link cost is output to the routing database, which causes the router to set up the multicast path and route the multicast stream along the second path.

In a particular embodiment, the first component of the second link cost comprises a link cost for a unicast path to a router through which passes a branch of the multicast tree. Optionally, the router is not one that is on the path that would be created using unicast routing protocols directly back towards the source, RP or S-DR.

In a particular embodiment, the first component comprises the unicast link cost of the path to the closest router in the multicast tree. Optionally, the closest router can be connected directly to the host designated router (H-DR). Optionally, the closest router comprises a H-DR for at least one other host.

In some embodiments, the second component comprises a link cost for the multicast tree from the branch to a rendezvous point, source designated router or source. Hence, the link cost can be calculated based on the link cost to join the nearest existing branch of a multicast tree and the link cost of the tree from that point back to an RP, S-DR or source for the multicast stream.

In a particular embodiment, the first multicast routing path comprises the shortest path to the RP, S-DR or source as determined according to a unicast routing protocol. This is the path along which the multicast tree would be built if the present multicast management method was not implemented.

In some embodiments, the method further comprises selecting a path for a multicast routing stream based on the adjusted least cost path and routing a multicast routing stream along the selected path.

In a particular embodiment, the method further comprises determining an adjustment factor for the first link cost based on information received from the content delivery network; and applying the adjustment factor to the first link cost. Hence the first link cost may also be an adjusted value based on factors such as those described below.

This may enable a more accurate comparison of the link costs along the first and second paths.

In some embodiments, the information received from the content delivery network comprises availability and/or capacity information for the second multicast routing path.

Optionally, the information received from the content delivery network comprises availability and/or capacity information for the first multicast routing path.

In a particular embodiment, the information received from the content delivery network comprises predicted availability and/or capacity information for one or both of the first and second multicast routing paths. That is, the information may include an indication of the expected capacity or availability of the paths, optionally based on a model of the expected network usage.

Optionally, the information received from the content delivery network comprises at least one of: congestion information; availability information; Quality of Service information; congestion prediction information; availability prediction information; traffic performance data; and traffic performance data prediction.

In one embodiment, the method is implemented in a router in the network. For example, each PIM router in the network may receive the necessary information to manage multicast routing paths according to the methods described herein.

In another embodiment, the method is implemented at a central network component and transmitted to one or more routers. Hence the central network component may calculate adjusted link cost values for paths in the network and push this information to PIM routers in the network.

In one embodiment, outputting the adjusted second link cost to a routing database comprises saving the adjusted second link cost to a Multicast Routing Information Base (MRIB). The adjusted cost optionally replaces and overwrites the first link cost in the MRIB.

In an alternative embodiment, outputting the adjusted second link cost to a routing database comprises transmitting the adjusted second link cost to at least one router in the network. Routers receiving the adjusted link cost can then add this information into their MRIBs.

In a particular embodiment, the method further comprises determining and adjusting a link cost for at least one further multicast routing path and analysing the adjusted link cost for the further multicast routing path to determine the least cost path in the content delivery network. Hence three or more paths may be analysed according to the methods described herein with the best path being selected for the multicast stream. This may be useful, for example, if there are several routers close to the requesting destination that are already members of the multicast tree.

Optionally, the information received from the content delivery network comprises traffic parameters made available on a per link basis. The method may further include collecting the traffic parameters on a per link basis.

In some embodiments, the traffic parameters are measured continually or periodically.

The method may further include collecting traffic parameters for links to neighbouring routers.

Optionally, the traffic information includes at least one of: bandwidth; delay; jitter; and delivery rate.

In some embodiments, the traffic information further comprises the rate of change of explicit congestion notifications (ECN) for the link.

Optionally, the traffic information is input into a training database for use by the predictive model.

In a particular embodiment, the traffic performance for a whole route is determined by combining values determined for individual links. In particular, the overall bandwidth for a route may be determined by the bandwidth of the minimum bandwidth link, the overall delay may be determined by the sum of the delay values per link, the overall jitter may be determined by the sum of the jitter values per link and the overall delivery rate may be determined by the delivery rate of the minimum rate link.

In some embodiments, the predictive model includes a prediction of how long the service level agreement for the multicast session can be guaranteed on the link.

Optionally, the method further comprises setting a flag in the routing table to indicate that the stored link cost is an adjusted link cost.

Optionally, the method further comprises setting at least one bit in a Join/Prune message to indicate that the route has been determined according to the methods described above.

Therefore, in some embodiments, there is provided a method for autonomously growing a multicast tree based on traffic considerations and network performance. When a PIM-SM enabled router receives a Membership Report from one of its IGMP-enabled hosts, it can perform a set of predictive data analytics evaluations to decide the best route to create its tree back to the source or the RP. Embodiments of the system described herein exist as an entity that maps a unicast routing metric to change the multicast routing metric in the MRIB (Multicast Routing Information Base), taking into account a set of multicast tree and unicast-related weighting factors. This change is reflected in its choice of Reverse Path Forwarding (RPF) next-hop neighbour to send group Join/Prune messages and also is used in Assert messages.

Factors that can be taken into account are such that the shape of the tree will slowly evolve in time, depending on current and predicted performance of various branches. It will branch out if the existing RPT is congested or expected to perform badly for the given service, or grow to exploit an existing tree and narrow down, thus preventing data replication in the network when the tree can sustain the data streams' demands. This demonstrates autonomous tree growth, depending on network conditions.

According to a second aspect, there is provided apparatus for managing routing paths in a content delivery network, the apparatus comprising:

means for determining a first link cost for a first routing path according to a unicast routing protocol;

means for determining a second link cost for a second routing path, the second routing path comprising a first component comprising a link cost to a router that is part of the multicast group and a second component comprising a link cost for the multicast tree from the router;

means for determining an adjustment factor for the second link cost based on information received from the content delivery network;

means for applying the adjustment factor to the second link cost;

means for analysing the adjusted second link cost and the first link cost to determine an adjusted least cost path in the content delivery network; and means for selectively outputting the adjusted second link cost to a routing database to influence routing in the content delivery network.

There is also provided herein apparatus for managing multicast routing paths in a content delivery network, the apparatus comprising a processor arranged for or logic configured for:

- determining a first link cost for a first multicast routing path according to a unicast routing protocol;
- determining a second link cost for a second multicast routing path, the second multicast routing path comprising a first component comprising a link cost to a router that is part of the multicast group and a second component comprising a link cost for the multicast tree from the router;
- determining an adjustment factor for the second link cost based on information received from the content delivery network;
- applying the adjustment factor to the second link cost;
- means for analysing the adjusted second link cost and the first link cost to determine an adjusted least cost path in the content delivery network; and
- selectively outputting the adjusted second link cost to a routing database to influence routing in the content delivery network.

A further aspect provides a computer program, computer program product or computer readable medium or logic arranged to implement any of the methods described above.

There is also provided a method according to any one described herein with reference to the figures and apparatus according to any described herein with reference to the figures.

A number of embodiments of the system have been described above. It will be clear to one skilled in the art that embodiments may be implemented independently. However, the embodiments are optionally implemented in conjunction with each other to provide multiple advantages as part of a larger system. Features of one aspect may be applied directly to other aspects of the system. Further, method features may be applied directly to aspects of the apparatus.

In particular, in all of the aspects described above, the destination may be a host or a host designated router, H-DR, in a multicast network. The host may be the end user terminal associated with an end user or consumer of the content or may be an intermediate device that serves the content to the user's device. For example, the destination may be a hub within a home network that receives the content for streaming to a user's terminal, such as an internet-connected television, a computer, a tablet or a telephone.

Similarly, in all of the aspects described above, the source may be the device that serves the content in the network or may be an intelligent routing component in the network that handles routing of content to destinations. The content may pass through the intelligent routing component, or the component may control other components in the network, such as the source, to implement the methods described herein.

Further, in all of the aspects set out above, the content is optionally video content and/or audio content, in particular on-demand content delivered in response to a request from a user. However, the skilled person will appreciate that the systems and methods described herein could equally be applied to networks for the distribution of data, such as text or image data, or software.

BRIEF DESCRIPTION OF THE DRAWINGS

Embodiments of the system and method will now be described in more detail with reference to the Figures in which.

DETAILED DESCRIPTION OF PRESENT EXAMPLE EMBODIMENTS

In the following description, the following terms may be used and take the normal meanings of which a skilled person in this technical area would be aware. In particular:

Host: an end user device or destination that requests some content from a source that can be delivered by unicast or multicast.

Source: provider of some content that either sends to hosts via unicast or pushes it into the network via multicast Content: electronic media, including but not limited to video files/streams, linear TV, audio files/streams (conference, radio, podcast), large file downloads etc.

DR: Designated router.

Figure 1:
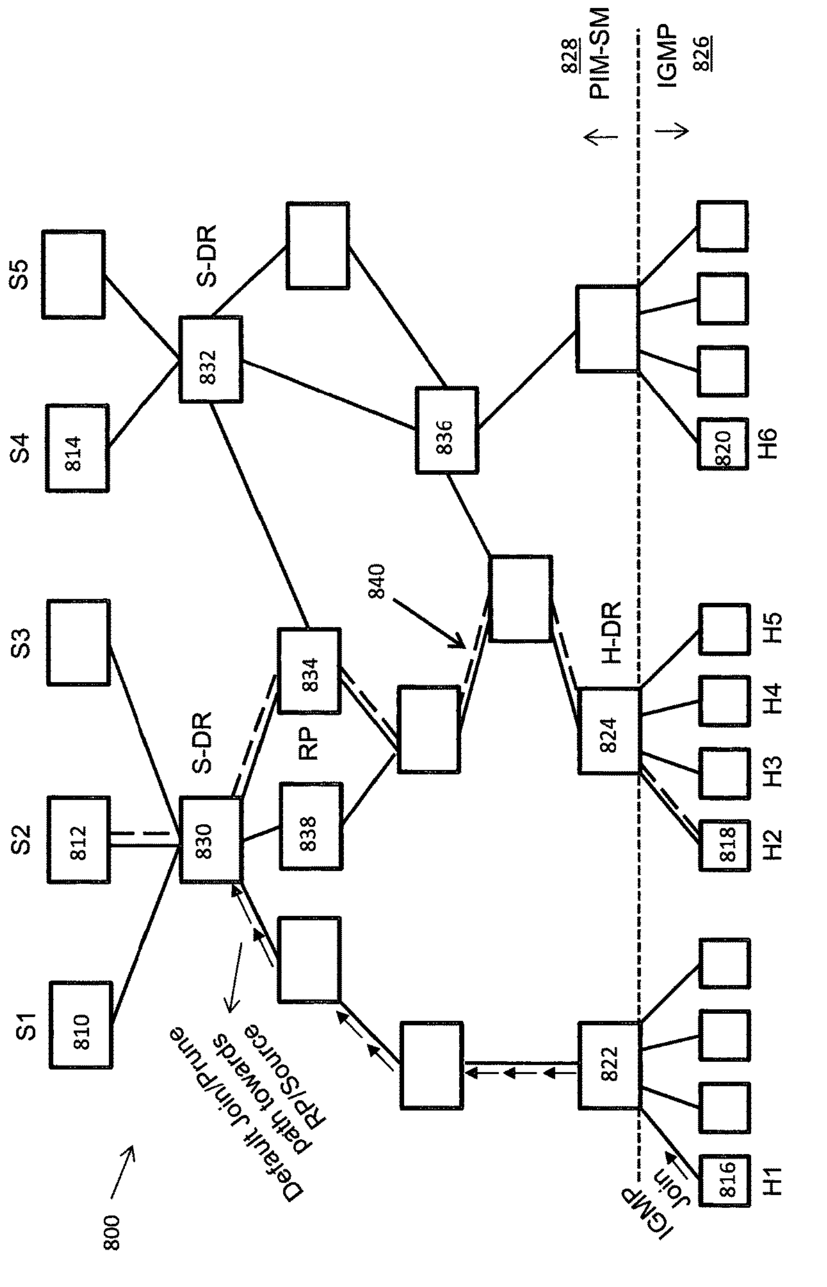
FIG. 1 is a schematic diagram of a network implementing multicast routing according to one embodiment.

A network 800 within which aspects of the present system may be implemented is illustrated schematically in FIG. 1. Multicast networks can be used to deliver content, such as video on demand content from one of a plurality of content servers, or sources 810, 812, 814, to each of a plurality of destinations or hosts 816, 818, 820. Multicast networks can be notionally divided into two sections, one of which 826 comprises the hosts and the adjacent routers 822, 824, which communicate using protocols such as the Internet Group Management Protocol (IGMP) to establish and manage the multicast group memberships of the hosts. In an IPv6 network, this section of the network may operate using Multicast Listener Discovery (MLD) and ICMPv6 (Internet Control Message Protocol) messaging and references to IGMP and other IPv4 protocols herein are intended to include and encompass equivalent IPv6 protocols.

The other notional section of the multicast network 828 typically uses a protocol such as Protocol Independent Multicast, usually in Sparse Mode (PIM-SM) to route and implement multicast in the rest of the network, from the sources 810, 812, 814 to the routers adjacent the hosts 822, 824. In particular, PIM-SM or similar protocols of which the skilled person will be aware are used to manage the membership of routers to multicast groups, which subscribe to content sources in the network.

FIG. 1 illustrates a multicast network 800 that includes a plurality of sources, 810, 812, 814, each of which is capable of providing or serving content to a host 816, 818, 820 via the network. The sources are connected to source designated routers (S-DRs) 830, 832, which manage the delivery of content from the source to components in the network.

The network also includes a number of intermediate routers, IRs, 836, 838 that carry the multicast streams (along with other network traffic) from the sources 810, 812, 814 to the hosts 816, 818, 820. The IRs may include one or more Rendezvous Points (RPs) 834 for particular multicast streams. The RPs 834 are routers in the network through which multicast data for a particular group passes to all the downstream routers unless the downstream router is in a source-specific mode. That is, downstream routers or hosts 824, 818 join the multicast stream through the RP 834. Therefore, the downstream multicast tree is centred on the RP 834.

The routers closest to the hosts or destinations can be termed host designated routers (H-DR) 822, 824. A multicast stream destined for a particular host 816 passes through the associated H-DR 822 and the host sends to its H-DR requests to join or prune from a particular multicast group using IGMP.

By way of further example, a source 812 multicasting content in a multicast group G, broadcasts advertisement messages for that content throughout the network. Host H2 818 receives the advertisement and wishes to receive the multicast data. The host 818 sends to its H-DR 824 an IGMP Join request specifying the multicast address of the multicast stream that it wishes to join, as detailed in the advertisement message, together with its membership information. The H-DR 824 builds a multicast tree back to the source 812 of the content, usually based on the shortest path through the network back to the S-DR 830 for the content. However, in most operational modes, the multicast tree must pass through the designated RP 834 for that multicast stream, and not through other IRs 838, even if these would provide a shorter path back to the S-DR 830. The H-DR 824 sends periodic Join/Prune messages towards the group-specific RP 834 for each group for which it has active downstream members.

If the host is the first to request the content in that area of the network, the tree may be built back to the S-DR 830. The multicast tree is indicated in FIG. 1 by a dashed line 840. Once the multicast tree has been built, multicast content can be delivered down the tree to the H-DR 824 and from there to the requesting host 818.

In PIM-SM based multicast systems, when a host Designated Router (host-DR) receives a Membership Report from one of its hosts to join a group G, it uses its unicast protocol to look up the address of the neighbour who is the next hop on the shortest path towards the RP (Rendezvous Point Tree, RPT) or the source (Shortest Path Tree, SPT). The same action is performed when an intermediate router receives a Join/Prune message from downstream routers with the same request. They use the unicast protocol's routing metric as the MRIB routing metric, associated with a metric preference that reflects the method through which this cost was learned (i.e. each unicast protocol has an associated metric preference value and metric costs can only be compared if the metric preference value is the same). The next hop neighbour with the lowest cost is chosen as the upstream neighbour, to which a Join/Prune message is sent. A Join/Prune message, as it travels all the way to the RP or source, triggers the creation of a Group-related route entry in each router. This reverse route that is built to the RP or the source is used to route the flow of multicast data packets in the downstream direction from the RP or source to the end host.

Each router on the multicast tree 840 maintains a route entry within an internal database, such as the Multicast Routing Information Base (MRIB), that includes information such as the source address, the group address, the incoming interface at which packets are received and a list of outgoing interfaces to which packets should be sent for onward transmission down the multicast tree. Timers, flag bits and other information may also be stored in the MRIB entry.

To leave a multicast group, G, the host 818 sends a Prune request to the H-DR 824, which then propagates upwards through the multicast tree to tear down that branch of the tree up to the point at which the tree is needed to deliver the multicast data to other hosts.

Whether the Join/Prune message is sent towards the RP or towards the source of the content depends on whether an RP Tree (RPT) or a Shortest Path Tree (SPT) is being built. It is also possible to have a source-specific tree being built along the RP which creates states in each of the routers on the RPT upstream to only forward data from a specific source S to the group G via the RPT. This is denoted by the state (S,G)rpt. An SPT is built when the Join Messages correspond to an (S,G) state, whereas an RPT is built when the Join messages correspond to the (*,G), (*,*,RP) or (S,G)rpt states. This is explained in RFC 4601. The tree growth mechanism described in more detail below can be applied in both SPT and RPT build states in exactly the same way as embodiments operate by changing the underlying MRIB values rather than affecting the tree structure externally. For the sake of simplicity, we henceforth assume that an RPT is to be created, but the methods any systems described herein apply may be applied to the building of other types of tree including shortest path trees and source specific trees.

The approach described above can have associated disadvantages, however. In particular, typical unicast protocols such as OSPF (Open Shortest Path First) build their cost value to a destination in proportion to the number of hops to the destination, the assumption being that the smaller the number of hops, the better the end-to-end QoS is likely to be. One approach may be to alter the cost value that is calculated by these unicast protocols, but functionality to enable this may not be available in every implementation of the underlying unicast routing protocol. Hence embodiments of the system described herein provide enhancements directly to the multicast 'layer', in particular by consuming the unicast cost value and adjusting this to affect the MRIB value stored and consequently the best next-hop for a router to join an RPT.

This is described in more detail below with reference to FIG. 2.

Figure 2:
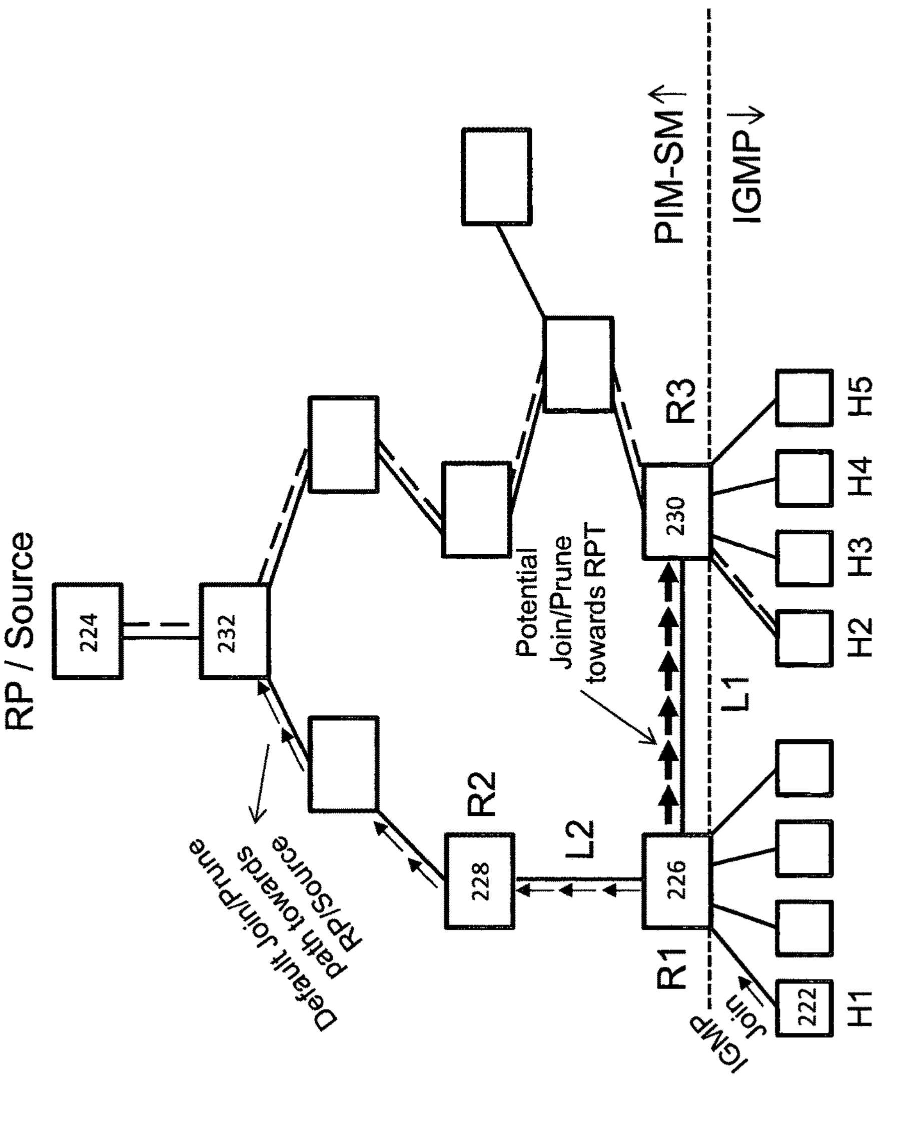
FIG. 2 illustrates a multicast tree building mechanism according to one embodiment.

In the network of FIG. 2, a host H1 222 wishes to join a multicast group G to receive content that is being broadcast by rendezvous point, RP, or source 224. The host 222 sends an IGMP Join message to its designated router R1 226.

While R1 226 is only one hop (L1) away from the RPT (indicated by the dashed line in FIG. 2) that serves content to the group it wishes to subscribe to, the PIM-SM specification will result in a new tree branch being set up to intermediate router R2 228 (through L2), which is the first router on the shortest path to the RP that is already a member of group G. This decision is taken since this new tree branch will be of a lower cost than joining the neighbour R3 230 to subscribe to the RPT, according to the unicast protocol, typically based on hop count. This results in replicated data flowing next to each other in this network, wasting network capacity. This replication may not be necessary if the end-to-end path from the RP 224 to the newly-joining DR 226 can, in fact, support the Quality of Service (QoS) that is required by the service that consumes data from this group. Also, choosing the shortest path to the RP 224 might in reality be a congested path or a degrading path if several routers have made the same decision. This might provide worse QoS than a longer, less congested path.

Therefore, embodiments of the present system provide intelligence in the routers, in particular a PIM router, to decide the next best hop to join a tree T, by optimising several factors, some of which are predictive, that affect QoS of the requesting service. The factors we take into account may enable the shape of the tree to evolve slowly in time, depending on current and predicted performance of various branches. It will branch out if the existing RPT is congested or expected to perform badly for the given service, or grow to exploit an existing tree and narrow down, thus preventing data replication in the network when the tree can sustain the data streams' demands. Hence embodiments of the system provide autonomous tree growth, depending on network conditions.

The decision mechanism for the MRIB values can be placed in each PIM router, which has visibility to the same data for use in the decision algorithm, or be computed externally and pushed to each PIM router using any of the existing network management protocols.

An embodiment of the sequence of steps performed by a PIM router that must decide its best RPF next hop to a given tree is described below. This is followed by an explanation of the generation of weighting factors that can be used to translate from a unicast routing metric to an MRIB routing metric for a given group/tree combination. Effects seen in the network after the decision mechanism is implemented are then described followed by impacts of the MRIB metric on the network routing. Finally, there is set out below an example implementation.

Figure 3:
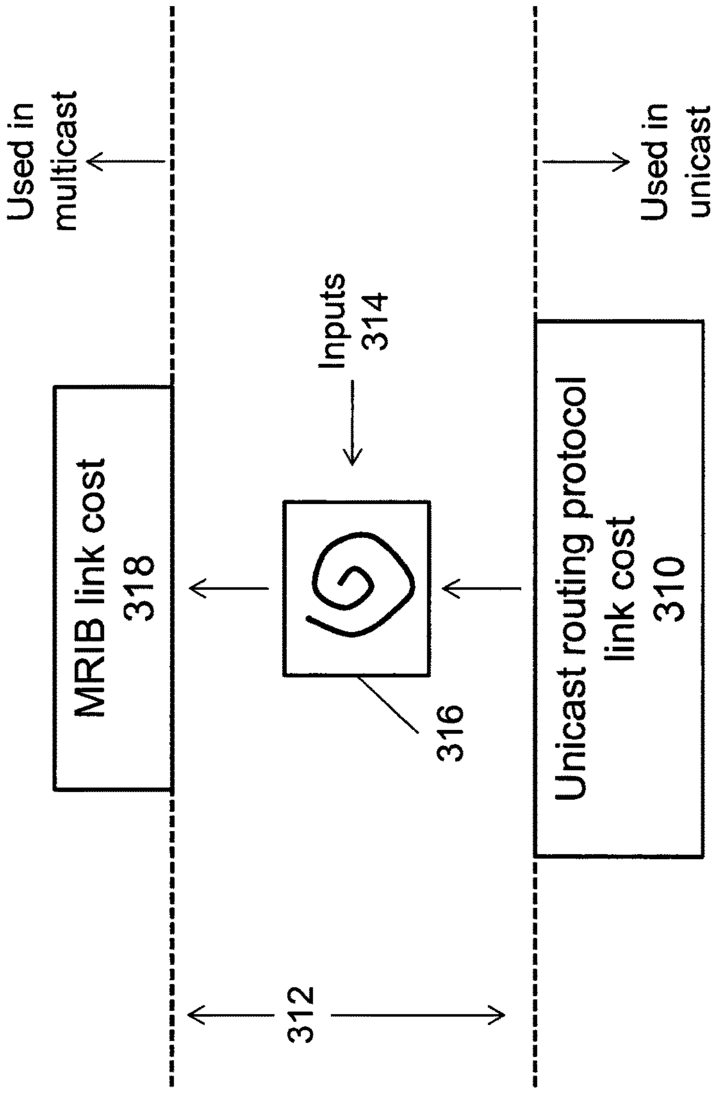
FIG. 3 illustrates schematically the overall MRIN link cost computation process according to one embodiment.

Changes that are made the network according to embodiments described herein are illustrated in FIG. 3 using a black box approach. The components of the black box are described in more detail below.

In order to make a decision at a given router R1 about its best next hop to join group G, each instance of the decision algorithm (whether run centrally or distributed across each PIM router) optionally has access to the following data:

1. RP address for G—that can be obtained using the hash function described in RFC 4601

2. IP address and unicast cost value of reaching the PIM router that is the least number of hops away that has an active (*, G) state.

3. Traffic performance-related data for the two routes (detail of metrics used are described below).

If each of the routers individually runs the decision mechanism, they can be fed with the predictive model that is built centrally and has access to the repository of stored data.

If there is no router with an existing (*, G) state for group G, this means that R1 is the first to create membership to group G at the RP and the algorithm need not be used. R1 sends Join/Prune messages directly towards the RP by default and creates a new tree branch. However, the next router $R_N$ that joins group G obtains the address of the nearest PIM router that transfers existing data streams relevant to G.

Note that the above requirements can be satisfied irrespective of whether a link state or distance vector protocol is employed for unicast. In the case of distance vector protocols such as the Routing Information Protocol, RIP, where visibility of the end-to-end pathway is not available to router R1, it only needs to obtain aggregate traffic and unicast cost measures using which it can perform its computation.

We assume for this embodiment that all the necessary information is available to router R1, which runs the decision algorithm below to decide who its best next hop will be to join the multicast tree for group G. Note that the unicast routing protocols are untouched, so that other streams in unicast are undisturbed by this technique. This is because one of the consideration factors relates to existing tree structures itself, which does not apply for unicast routing.

Consider that R1 receives a (*, G) IGMP Join message from one of its end hosts if it is a DR for this host or that it is an intermediate router that receives a (*, G) Join/Prune message from a downstream router. It performs the following tasks:

1. R1 evaluates a cumulative MRIB routing metric using the existing PIM-SM specification, which would result in creating a shortest path tree branch to the RP.

2. R1 evaluates a cumulative MRIB routing metric for the shortest path to join the existing RPT for group G.

3. R1 chooses the next best hop as the one that yields the lower routing metric from the above steps.

We henceforth refer to the shortest path to the RPT (i.e. nearest PIM router, determined from the unicast routing protocol, with an active (*, G)) as p(RPT, G) and its corresponding next hop from R1 as next_hop(RPT, G), and the unicast shortest path to the RP as p(RP, G) and the corresponding best next hop from R1 as next_hop(RP, G). We refer to the generic term for the optimized route for the group G for its subscription to the RP, be it p(RP, G) or p(RPT, G), as MRIB.p(G) and the generic best next hop for group G as MRIB.next_hop(G).

Note that as an extension from this technique, R1 could perform a multi-dimensioned optimisation of N combinations of links to derive the best route MRIB.p(G) for subscription of group G to the RP. This could involve having to know the topology of the network. For simplicity, we demonstrate key elements of the technique to only compare p(RPT, G) vs. p(RP, G) to choose MRIB.p(G) but any number of route choices can be optimised by extension of the same algorithm.

In fact, it is possible that once R1 sends its (*, G) Join/Prune message towards its chosen next hop R2 after the above evaluation, the next hop performs the same tasks, which might result in the first decision being altered because the unicast next hop counts to the RP and the nearest PIM router on the RPT are different for R1 to R2. Whether or not this happens depends on the weighting factor assigned to the unicast hop count.

Hence, in FIG. 3, a unicast routing protocol link cost 310, which would usually be used in a unicast routing method, is input to an intelligent data analytics capability. Further inputs to this process may include for example tree structure information and traffic, congestion and/or demand information. This information is processed 316 to determine an MRIB link cost 318 that can then be used in the multicast network.

Note that this method can be used by PIM routers each time they receive a Join/Prune refresh from downstream routers/hosts. This would result in the tree structure gradually evolving to reflect the current reliability and congestion of the respective tree branches. For example, if the end-to-end performance of joining the RPT further downstream is evaluated to be worse than creating a tree branch on the shortest path towards the RP, this means that the trunk of the multicast tree is congested or that its host members are too far away from the RP for their Service Level Agreement (SLA) metrics to still be met. In this scenario, the system automatically triggers a new tree branch to be generated on the shortest path to the RP, to which other PIM routers can join and prune off the trunk.

Should PIM routers decide to change their next hop entry while they are currently active members of the group, note that they should prune off from the old tree after successfully receiving data on the new branch.

Note that in order to keep traffic information up-to-date and not drastically vary during each collecting period, each router can enable a tree_route_timer with a maximum value that may be user-prescribed, which is set at random when it sends its first Join/Prune for a particular source/group/RP. When the timer expires, the PIM routers perform a check on whether or not to change their choice of upstream next hop router. Else, all routers will evaluate at the same time and can cause changes that will impact traffic flow statistics, potentially leading to unstable behaviour.

A method of computing a traffic performance-related metric for routes used for multicast will now be described. We assume that each multicast stream requires a certain QoS value or SLA. This can be, for example, determined by the required bandwidth (e.g. 2 Mb/s), the acceptable delay (e.g. 20 ms), the acceptable jitter (e.g. 2.0 ms) and/or packet delivery rate of 99.9%. Instead of identifying a route based on the number of hops we can then pick a route that meets the SLA for the multicast stream in question. The traffic related parameters can be measured continuously and made available on a per link basis. They can be stored locally by the routers or sent to a central management unit in regular intervals and can be kept in a central data store. The performance of a complete route can be calculated by combining the individual link values. The overall bandwidth is defined by the minimum bandwidth, the overall delay and jitter by the sums of delay and jitter values per link and the delivery rate is again the minimum rate over all links in the route. If other performance values are used, similar aggregations can be computed.

Predictive information can also be used for the route selection. Instead of using simply the current performance statistics, the system can be arranged to predict for how long the SLA for the multicast session can be guaranteed on each link. For this the system collects historic performance information for each link and stores it in a training database. The historic information can be collected in the following way. Each time a host or intermediate router joins a multicast stream (or for a random sample of hosts/routers joining to reduce the amount of data) we record the time a host/router joined, the individual SLA requirements and the duration after which the SLA was broken. If the SLA was not broken, we store the duration of the stream instead. We also record the success of maintaining the SLA by storing a ‘0’ if the SLA was broken and a ‘1’ otherwise. The fields “duration” and “broken” can become the target values of the predictive algorithm.

Traffic information can also be collected for each link, for example, by keeping track of the available bandwidth per link at a particular time. Depending on the preferences of the network operator this can be done in intervals of several minutes or hours and for daily or weekly profiles. For example, if the operator decides that traffic profiling is best done via a weekly profile in 5 minute intervals we would store 7*24*12=2016 values for the currently available bandwidth per link. Other traffic related statistics such as the rate of change of explicit congestion notifications (ECN), which gives an indication of the onset of traffic congestion on the link, can be collected in the same way in different time resolutions.

If the network provider keeps track of predicted or expected traffic on links and this information is available then the system can also store this information each time a multicast stream begins. For example, assume the network provider keeps track of expected traffic per link per hour for the next 24 hour period. The network provider can obtain these values by running a predictive algorithm using values from a traffic reservation scheme.

The following table, which is an example extract from an embodiment of a training database, illustrates some training data examples that can be collected and the following abbreviations are used in the table.

Link ID: ID of the link for which these values are stored cap: link capacity in Mb/s DoW: day of week (1=Monday, 2=Tuesday, . . . )

hour: hour when host joins to multicast group min: Minute when host joins to multicast group bw: requested bandwidth for stream in Mb/s delay: requested maximum delay for stream in ms jitter: requested maximum jitter for stream in ms length: length of the stream in minutes B: average available bandwidth on the link in the last hour D: average delay on the link over the last hour J: average jitter on the link over the last hour exp bw: the expected minimum average free bandwidth during the duration of the stream from the traffic profile of the link that was valid when the stream was running max exp: the maximum expected traffic during the duration of the stream duration: duration after which SLA was broken or duration of stream if SLA was not broken ok: 0 if SLA was broken during the stream, 1 otherwise

| Link ID | Cap | DoW | hour | minute | Bw | Delay | Jitter | Length | B | D | J | Exp bw | max exp | duration | ok |
|---|---|---|---|---|---|---|---|---|---|---|---|---|---|---|---|
| 1 | 100 | 3 | 18 | 30 | 2 | 20 | 2 | 115 | 26 | 15 | 2 | 23 | 75 | 115 | 1 |
| 23 | 80 | 2 | 22 | 0 | 4 | 20 | 2 | 90 | 10 | 19 | 2 | 12 | 82 | 57 | 0 |

The training database can then be used in the system to create a predictive model. This can be done, for example, by training two neural networks NN1_*i* and NN2_*i* (multilayer perceptrons) per link L_i using the attributes from DoW to max exp as input values and the two attributes duration and broken as output values, respectively. By using a sufficient number of training samples the networks would be able to predict duration and broken, respectively. The prediction of duration can be interpreted as the average duration the link can sustain the SLA and the prediction of broken can be interpreted as an average likelihood that the SLA would fail on the link. The actual prediction of the time period the SLA can be sustained would be the product of values for ok and duration. By combining two predictive values the average error of the prediction can typically be reduced.

An example for a prediction is set out below: assume we are looking for the prediction if a link L_i can sustain the SLA for a multicast stream on Wednesday, at 20:00 for 100 minutes requiring 3 Mb/s, a maximum delay of 25 ms and a maximum jitter of 1 ms. The link performance over the last hour was B=21, D=18, J=0.8. Assume that minimum of the expected free bandwidth for this link from the traffic profile is 25 Mb/s between 20:00 hrs and 21:40 hrs on a Wednesday. Assume further that the maximum expected traffic is 60 Mb/s for the same time window. Assume we apply the networks for links L_RPT1 (first hop link on shortest path to the RPT, next_hop(RPT, G)) and L_RP1 (first hop link on shortest path to the RP, next_hop(RP, G)).

NN1_RPT1 (3,20,0,3,25,1,120,21,18,0.8,25,60)=135 and

NN2_RPT1 (3,20,0,3,25,1,120, 21,18,0.8,25,60)=0.9

NN1_RP1 (3,20,0,3,25,1,120,21,18,0.8,25,60)=145 and

NN2_RP2 (3,20,0,3,25,1,120, 21,18,0.8,25,60)=0.7

We compute 135*0.9=121.5 and use this value for predicting the duration link L_RPT1 can support the SLA of the multicast stream. For link L_RP1 we get 101.5. In order to obtain link cost values such that a routing algorithm can use the minimum cost criterion we use 1/121.5=0.0082 and 1/101.5=0.0099 instead.

To compute the prediction for a complete route, we invoke the neural nets for all links of the route and add up the cost values for the route. Assume that the result of this computation for the RPT is 0.0645 and for the RP is 0.0489. Note that weighting factors can be introduced in the summation to give some links or portions of the route more importance than others, if applicable.

Note that p(RPT, G) comprises of a multicast tree section and a unicast branch section. We now compute our MRIB metric in this embodiment as:

$$\text{MRIB metric}=(\text{unicast\_cost\_metric}\times\text{weight\_factor1})+(\text{performance\_metric}\times\text{weight\_factor2})$$

The total cost of the two routes can now be calculated, taking into account the weighted unicast cost as well. Assume that the weighting factor for unicast cost is 1 and the weighting factor for performance is 100 so that the two values are on the same scale.

This yields:

$$\text{MRIB cost for } p(\text{RPT},G)=1+(0.0645\times 100)=7.45$$

$$\text{MRIB cost for } p(\text{RP},G)=4+(0.0489\times 100)=8.89$$

Note that the weighting factors for the unicast and performance portions of the MRIB value can be important. In this example, we chose 100 because the performance metric is in the scale of $10^{-2}$ whereas the link cost is in the scale of $10^{0}$. The maximum link cost in this small network is not more than 10 hops, which means that once adjusted, the performance metric and the unicast cost metric would roughly contribute to the same extent to the over MRIB cost. However, in a larger network, the number of hops to a destination can be significantly more than 10 and this will contribute more to the overall MRIB cost compared to a performance metric scaled up by 100. This means that smaller changes on the unicast cost will affect the final decision more than larger changes in the performance cost. This may or may not be desirable. The important note is therefore that one must ensure that the influence of each component on the overall MRIB value reflects the importance of the component as desired by the operator.

Now that the overall MRIB routing metric has been calculated, the route with the lowest value can then be selected. In this example, the host-DR will decide that p(G) is p(RPT) and will send the Join/Prune message towards the nearest PIM router rather than sending it on the shortest path towards the RP. It is possible that the next intermediate router (next_hop(G)) will perform the same tests to decide whether or not to continue this route to the multicast tree or change direction towards the RPT. This change can happen if the unicast cost value is given more importance that the performance-based cost value. The prediction can be repeated in regular intervals using updated link performance and traffic prediction parameters in order to re-evaluate the route.

Other ways of building a predictive model are possible. If we don't wish to maintain a model per link, we can build one model using only the link capacity to distinguish between different types of links. The attribute cap would then become an additional input to the model. Instead of neural networks we can use linear or polynomial regression, etc.

The predictive model(s) can be built by a central unit and are either applied by this central unit or distributed to all routers which can then apply the predictive models themselves.

The effect in the network of the above decision mechanism is that the multicast tree branches that are established as a result of Join/Prune messages and host memberships are optimised in such a way that if a particular branch is performing poorly, the PIM routers of this network will autonomously grow new branches so as to spread the traffic for a single tree over several pathways. However, if the branch can support the traffic being carried through it, the services make better use of the network and consolidate multiple streams to a narrower tree structure (rather than branching out extensively), so that data replication along adjacent links is prevented. This autonomous multicast tree evolution behaviour happens without user intervention even for PIM routers that are already part of the tree, purely from periodic triggering of the traffic-based decision mechanism we propose.

Since the MRIB metric makes no assumption on the unicast routing protocol and also makes no changes to the unicast routing metric, it does not affect any unicast traffic flowing through the same network. The MRIB metric value can be associated with an administratively assigned metric preference that can then be used by the multicast routing protocol such as PIM-SM to compute the next best hop. For example, if the metric preference is set such that an MRIB value computed using the above method has more priority over an MRIB value mapped from the unicast cost, routers that have access to this predictive model will use this method over the default multicast tree building method. The method described has combined RPF and existing multicast tree building mechanisms with an additional overlay of network performance to influence multicast tree structures. When done periodically, the multicast tree will evolve by taking into account current network performance.

MRIB metrics are used in Join/Prune messages as well as in Assert messages. This is explained in RFCs 4601 and 2362.

Note also that this method of tree growth can be used to build both SPTs and RPTs as only the underlying MRIB value is changed which is then used to build the tree that is required by the join request of the IGMP Membership Report.

Ideally, MRIB metric changes will be uniform if all decision instances have access to the same data. However, the operator might also introduce a method of explicitly denoting that a tree has been built using this method as opposed to the default SPT or RPT method by using one of the 5 reserved bits in the Encoded-Source-Address (Section 4.1, RFC 2362). These bits are currently ignored on receipt but can potentially be used to explicitly declare the method of tree growth. This Encoded-Source-Address is used in Join/Prune messages. This might be important when building an SPT since an SPT built using our method may not necessarily still be the shortest path (smallest number of hops) to the source. It will be the shortest path with the best network performance reliability (depending on the weighting factors applied to unicast and performance costs above). PIM-SM has been specified such that if the route entry for a given state does not match the interfaces on which a PIM-SM router receives packets from a given neighbour for this state, it drops these packets. This might occur because some routers have changed their MRIB.next_hop neighbour whereas others are still waiting for the timer to expire to re-compute. Therefore, inconsistencies might occur during these transition periods. This is when using the reserved bits embedded in the Join/Prune message can be useful, so that a PIM router knows that the neighbour from which it has received this message with the reserved bits non-zero has used a different tree building metric to its own and it therefore must not discard the incoming message. Such inconsistencies are less likely to occur if all MRIB values are changed at exactly the same time throughout the network.

Similarly, the Assert message can use an assigned metric preference value to denote that an MRIB cost has been derived using the methods described herein as opposed to the default method, so that PIM routers comparing the metric value can use the metric preference first to determine which method of deciding the best next hop is better.

A further example of the operation of the present system and method is now set out below with reference to FIG. 2. Assume that an end host H1 222 sends its host-DR 226 a Membership Report to join group G with a (*, G) membership. This means that the DR 226 receiving this request must resolve the address to the correct RP using the existing hash function and then send a (*, G) Join/Prune message to subscribe to this tree. Traditionally, the host-DR will use its unicast routing protocol to determine the best next hop towards the RP 224 and send the Join/Prune message to this next hop router. However, embodiments of the present method intervene at this stage and determine the best next hop instead of using the default towards the RP. The advantages of doing this have been explained previously in the IRF.

We assume in the present example that our system only evaluates 2 routes but this method can be extended to evaluate any number of possible routes.

The first is a summation of two segments:

1. The shortest path to the RPT, in this case at router R3 230, which we refer to as p(RPT, G)_U. This would be the unicast path to the nearest PIM router 230 that already has an active (*, G) membership on this tree.

2. In order to be comprehensive, we also evaluate the multicast portion of the tree until the start of the branch 232 to the host-DR 226. We refer to this as p(RPT, G)_M. The method then evaluates the end-to-end route (summation of p(RPT, G)_U with p(RPT, G)_M), for suitability. We refer to the combined route as p(RPT, G). Once set up, a new tree branch will flow from the nearest (*, G)-active PIM router to the host-DR 226. The end-to-end path from the RP 224 might be longer than the end-to-end path of H1 222 directly to the RP.

The second route evaluated is the shortest path to the RP. This may or may not comprise links that already are part of the RPT. If the Join/Prune message reaches a PIM node with an active (*, G) state on its shortest path to the RP, the new tree branch will be set up from this point.

An MRIB value is now computed for each of these routes. This MRIB value is no longer the same as the unicast cost value but instead comprises weighting the unicast cost value and adding this to a weighted computed network performance-based cost value (described below). The path that has the lowest MRIB cost value will be p(G) and the next hop router on this path will be next_hop(G) to which the Join/Prune message is sent.

We assume that the unicast cost function only takes into account the number of hops from the host-DR 226 to the required destination. Here we refer to the nearest PIM router with an active (*, G) state as R3. From the above network topology, we can see that the unicast cost to R3 is 1 and the unicast cost to the RP is 4.

We also take into account the performance demand of the service. Assume that this host-DR 226 requests membership on Wednesday, at 20:00 for 100 minutes requiring 3 Mb/s, a maximum delay of 25 ms and a maximum jitter of 1 ms. The link performance over the last hour was B=21, D=18, J=0.8. Assume that minimum of the expected free bandwidth for this link from the traffic profile is 25 Mb/s between 20:00 hrs and 21:40 hrs on a Wednesday. Assume further that the maximum expected traffic is 60 Mb/s for the same time window.

We now use the predictive model, built using two neural networks, to predict if the link to next_hop(RPT, G) will sustain the required stream for the required duration.

We call this link L_RPT1. We perform the same evaluation for L_RP1, which is the link to next_hop(RP, G).

NN1_RPT1 (3,20,0,3,25,1,120,21,18,0.8,25,60)=135 and

NN2_RPT1 (3,20,0,3,25,1,120, 21,18,0.8,25,60)=0.9

NN1_RP1 (3,20,0,3,25,1,120,21,18,0.8,25,60)=145 and

NN2_RP2 (3,20,0,3,25,1,120, 21,18,0.8,25,60)=0.7

We compute 135*0.9=121.5 and use this value for predicting the duration link L_RPT1 can support the SLA of the multicast stream. For link L_RP1 we get 101.5. In order to obtain link cost values such that a routing algorithm can use the minimum cost criterion we use 1/121.5=0.0082 and 1/101.5=0.0099 instead.

Therefore, performance cost for L_RPT1=0.0082 and for L_RP1=0.0099.

We must add up this performance for all links on p(RPT, G) and p(RP, G) by invoking the neural nets on each link. Note that p(RPT, G) comprises a multicast tree section and a unicast branch section. Note that weighting factors can be introduced in the summation to give some links or portions of the route more importance than others, if applicable. Assume that the result of this computation for the RPT is 0.0645 and for the RP is 0.0489.

The total cost of the two routes is now calculated, taking into account the weighted unicast cost as well. Assume that the weighting factor for unicast cost is 1 and the weighting factor for performance is 100 so that the two values are on the same scale.

This yields:

$$\text{MRIB cost for } p(\text{RPT},G)=1+(0.0645\times100)=7.45$$

$$\text{MRIB cost for } p(\text{RP},G)=4+(0.0489\times100)=8.89$$

Now that the overall MRIB routing metric has been calculated, the route with the lowest value can then be selected. In this example, the host-DR will decide that p(G) is p(RPT) and will send the Join/Prune message towards the nearest PIM router rather than sending it on the shortest path towards the RP. It is possible that the next intermediate router (next_hop(G)) will perform the same tests to decide whether or not to continue this route to the multicast tree or change direction towards the RPT. This change can happen if the unicast cost value is given more importance that the performance-based cost value.

The prediction can be repeated in regular intervals using updated link performance and traffic prediction parameters in order to re-evaluate the route.

This MRIB metric cost is used not only for Join/Prune messages but also in Assert messages.

References in the preceding discussion to a content delivery network should not be interpreted in a restrictive manner. A method according to the present invention may be implemented within any communications network which is capable of supported unicast and multicast. Furthermore, the use of a method according to the present invention is not limited to audio or video content data and may be used to transmit other types of data.

As the present invention may be implemented on software within a router, or other device, it may be possible to upgrade a conventional router (or device) to one which can perform a method according to the present invention. Computer code may be deployed to a modem (or router) via download, for example via the internet, or on some physical media, for example, DVD, CD-ROM, USB memory stick, etc.

The present invention provides a method of managing routing paths, in particular multicast routing paths, in a content delivery network. The method includes determining, according to a unicast routing protocol, a first link cost for a first routing path and determining a second link cost for a second routing path, the second routing path comprising a first component comprising a link cost to a router that is part of a multicast group and a second component comprising a link cost for the multicast tree from the router. An adjustment factor is then determined based on information received from the content delivery network. The adjustment factor is applied to the second link cost. The adjusted second link cost and the first link cost are analysed to determine an adjusted least cost path in the content delivery network and the adjusted second link cost is selectively output to a routing database to influence routing in the content delivery network.

What is claimed is:

1. A method of managing routing paths in a content delivery network, the method comprising:

determining a performance cost for a first routing path, the first routing path comprising a shortest path from a host to a rendezvous point or source for a multicast transmission;

determining a performance cost for a second routing path, the second routing path comprising a path from the host to a closest router in an existing multicast transmission tree;

selecting the routing path with a lowest performance cost for joining the multicast transmission; and delivering content using the selected routing path; wherein:

the performance cost for the first routing path comprises a unicast link cost of the first routing path and a predicted performance cost for the first routing path modified by a first relative weighting factor;

the performance cost for the second routing path comprises a unicast link cost of the second routing path and a predicted performance cost for the second routing path modified by a second relative weighting factor;

the predicted performance cost for each of the first and second routing paths are derived from one or more transmission parameters; and the routing path with the lowest performance cost is selected by the host for joining the multicast transmission.

2. A method according to claim 1, wherein a Join/Prune message is transmitted over the selected routing path.

3. The method according to claim 1, wherein the predicted performance cost for each of the first and second routing paths are based on a determination of an average duration that the respective routing paths can sustain a data stream at a requested quality of service level.

4. The method according to claim 1, wherein the predicted performance cost for each of the first and second routing paths are based on a determination of the likelihood that the respective routing paths fail to provide a requested quality of service level for the data stream.

5. A method according to claim 1, wherein the one or more transmission parameters are selected from bandwidth, delay and/or jitter.

6. A method according to claim 1, wherein the predictive model used to determine the routing path performance cost comprises a plurality of neural networks.

7. The method according to claim 1, wherein the one or more transmission parameters are input into a training database for use by the predictive model.

8. The method according to claim 1, further comprising setting a flag in a routing table to indicate that the stored link cost is an adjusted link cost.

9. The method according to claim 1, further comprising setting at least one bit in a Join/Prune message to indicate that the route has been determined.

10. A non-transitory computer-readable medium storing one or more computer programs, which upon execution by a computer processor implements the method according to claim 1.

11. The method according to claim 1, wherein the unicast link cost of the second routing path is based on the number of unicast hops from the host to the closest router of the existing multicast tree.

12. The method according to claim 1, further comprising autonomously growing the existing multi-cast tree using the selected routing path.

13. An apparatus for managing routing paths in a content delivery network, the apparatus comprising:

a computer system, including a hardware computer processor and a non-transitory computer-readable medium storing one or more computer programs, which upon execution by a computer processor, configures the computer system to at least:

determine a performance cost for a first routing path, the first routing path comprising a shortest path from a host to a rendezvous point or source for a multicast transmission;

determine a performance cost for a second routing path, the second routing path comprising a path from the host to a closest router in an existing multicast transmission tree;

select the routing path with a lowest performance cost for joining the multicast transmission; and deliver content using the selected routing path; wherein:

the performance cost for the first routing path comprises a unicast link cost of the first routing path and a predicted performance cost for the first routing path modified by a first relative weighting factor;

the performance cost for the second routing path comprises a unicast link cost of the second routing path and a predicted performance cost for the second routing path modified by a second relative weighting factor;

the predicted performance cost for each of the first and second routing paths are derived from one or more transmission parameters; and the routing path with the lowest performance cost is selected by the host for joining the multicast transmission.

14. The method according to claim 11, wherein the one or more transmission parameters used for deriving the predicted performance cost for the second routing path are selected from bandwidth, delay and/or jitter.

15. The apparatus according to claim 13, wherein the unicast link cost of the second routing path is based on the number of unicast hops from the host to the closest router of the existing multicast tree.

16. The apparatus according to claim 15, wherein the one or more transmission parameters used for deriving the predicted performance cost for the second routing path are selected from bandwidth, delay and/or jitter.

17. The apparatus according to claim 13, wherein the computer system is further configured to autonomously grow the existing multi-cast tree using the selected routing path.

* * * * *